Figure 1:
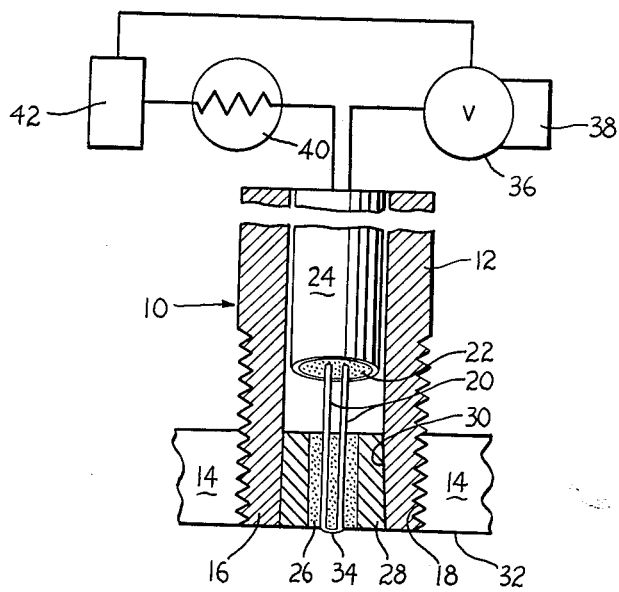

Feb. 22, 1966    J. MACATICIAN ETAL    3,236,096
ELECTRICAL GAUGE FOR SENSING THE AMOUNT OF
EROSION OF A SOLID MATERIAL
Filed March 6, 1962

INVENTORS
JOHN MACATICIAN
JACOB NANIGIAN
BY
AGENT

United States Patent Office 3,236,096
Patented Feb. 22, 1966

3,236,096
ELECTRICAL GAUGE FOR SENSING THE AMOUNT OF EROSION OF A SOLID MATERIAL
John Macatician, Lake Hopatcong, N.J., and Jacob Nanigian, Indian Head, Md., assignors to Nanmac Corporation, Needham Heights, Mass., a corporation of Maryland
Filed Mar. 6, 1962, Ser. No. 177,786
3 Claims. (Cl. 73—86)

This invention relates generally to electrical measuring instruments and more particularly to a gauge which senses the erosion or amount of the wearing away of a solid material.

Various types of corrosion or erosion gauges are known in the art and most of these apparatus determine the amount of corrosion or erosion by measuring the related change in resistance of a test piece which is sometimes determined by the use of a reference specimen protected from eroding conditions. In general, such gauges have not been satisfactory for one or more of a number of reasons such as: a lack of accuracy; an impractical bulkiness due to the inclusion of temperature measuring means or to poor design; inability to withstand high temperatures and/or pressures; and an unnecessary complexity accompanied by higher cost.

Accordingly, the main object of the present invention is to provide a gauge which senses or measures the amount of erosion of a solid material which is not subject to the above and other objectionable characteristics of known structures.

An important object of the present invention is to provide an improved erosion gauge which is embedded within the material to be eroded and which erodes uniformly and coincidentally therewith so as to continuously sense the erosion as contrasted with sensing it in steps or increments by a make or break contact.

Another important object of the present invention is to provide an improved erosion gauge having resistance elements so arranged that the erosion is readily determined by maintaining the resistance and current of an electric circuit, of which the gauge is a part, substantially constant and measuring the change in voltage drop across the elements.

A further important object of the invention is to provide an improved erosion gauge of novel though simple construction which can be made in minute sizes, will be relatively inexpensive and susceptible of ready and economic manufacture, and will withstand the high pressures and temperatures of erosive atmospheres, such as are encountered in rocket engines, etc.

Other objects and advantages of the invention will become apparent during the course of the following description.

Figure 2:
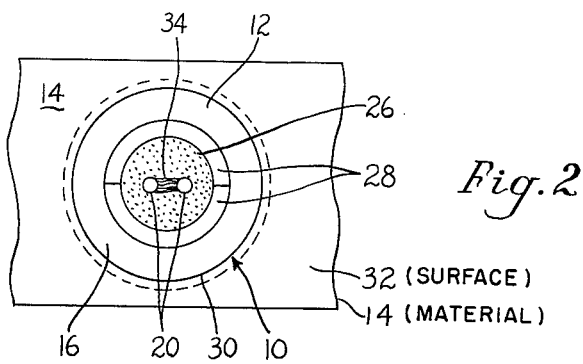

In the drawings I have shown one embodiment of the invention. In this showing:

FIGURE 1 is a central, vertical, sectional view of the erosion gauge comprising the present invention including a schematic electrical circuit therefor; and FIGURE 2 is an end view of the gauge showing the resistor formed between the two conductive erosion elements.

Referring to the drawings numeral 10 designates the erosion gauge as a whole which comprises a hollow, tubular gauge body 12, which is preferably of the same material as that of the solid material 14 which is to be subjected to erosion and in which the gauge is mounted as by taper pressing the body end 16 into a tapered aperture 18 in the material 14. If desired the body and the aperture may be threaded for such mounting.

A pair of electrically conductive erosion elements 20 which may be metal ribbons, painted or deposited metal films, conductive oxides or semi-conductors, traverse the eroding material 14 by way of the body 12 in such a manner that they are perpendicular to the surface of the solid material. The elements 20 are spaced from each other and mounted in insulation 22 by means of a metal tube 24 swaged over the elements and the insulation such as magnesium oxide.

A basic requirement of the conductor elements 20 is that current can be passed through it in the order of 1 milliampere and up beyond 100 milliamperes. The low currents would be used with elements containing high resistances and the high currents with elements of lower resistance.

One important feature mandatory of each of the resistive elements 20 is that its thermal coefficient of resistance remain low over the operating temperature range. Thus if the elements, embedded in the eroding material 14, rise to a high temperature before erosion affects them, their resistance should remain constant as much as possible in order to minimize errors. For example, metals normally increase their resistance with temperature and the overall effect would be an indication of increased length. There are good candidate materials for this application. One of the better is "Kanthal A–1" with a coefficient of 32.4 millionths per degree centigrade averaged over the temperature range of 20 to 1,350 degrees centigrade. There are other materials of lower coefficient but in a more limited temperature range. "Manganin" and "Constantan" are both low but only to about 300 degrees centigrade. It is obvious that a variety of situations could arise which would incorporate a varied selection of materials but in essence that element having the lowest coefficient would be the most desirable.

The two erosion elements 20 which as shown in FIGURE 1 are electrically conductive ribbons electrically insulated from each other and from the wall of the material by very thin sheets of mica 26, although other thin insulation may be used. This assembly is placed between the halves of a split tapered pin 28 all of which is then pressed into a matching tapered hole 30 of the body 10 or the latter can be omitted and the assembly pressed into the tapered aperture 18 of the solid material 14.

The pin halves 28 are fabricated of the same material to insure rigid mechanical placement of all parts and preferably (as well as the body 16) are of the same material as the solid material 14 so that the rate of erosion is the same for all. The erosion elements 20 will of necessity erode at the same rate as the solid material 14.

At the erosion surface 32 of the solid material 14, the conductive gauge elements 20 are ground or sanded by erosion such that their ends are mechanically induced to bridge their gap over the insulation 26 in the manner explained in U.S. Patent Number 2,829,185 to the present inventors, thereby making a firm electrical connection 34 between the two elements 20. The net result is that at the open ends of the elements, a resistor 34 is formed. One of the elements may be much more reduced in specific resistance than the other so that its contribution to the series resistance is negligible.

It will be apparent that as erosion proceeds (for example where surface 32 is the interior surface of the combustion chamber of an operating rocket engine), both of the gauge elements 20 recede together with the surface 32 of the material 14 with the net result that the resistance of the elements is decreasing due to their decrease in length.

This is made possible by the fact that as the material 14 erodes, and the elements 20 erode, they continuously bridge the insulation gap to make electrical contact. This important feature has been definitely ascertained by experiments to be actually true.

If as the surface 32 erodes, the specific resistance of the elements 20 remain constant, the change in resistance of the elements 20 is directly proportional and linear to their decreased length. If an electrical current is passed through the elements 20 (resistance) and maintained essentially constant even though the resistance is changing, then by Ohm's law, the voltage drop across the resistive elements is linear and directly proportional to the changing resistance or to the eroding distance. The voltage signal or reading of the voltmeter 36 is then transmitted to a suitable recording apparatus 38 and the voltage signals recorded will be indicative and proportional to the erosion rate.

A very nearly constant current can be maintained through the changing resistance of the elements 20 by placing it in series with a radio tube 40 containing a high plate resistance. The electrical circuit includes a source of power 42 and if the ratio of the resistance of the elements 20 to the plate resistance of the tube 40 is very low, then the change in current as the resistive element approaches zero is also very small—and this can be extended so that the current change is negligible.

It is to be understood that the form of the invention herewith shown and described is to be taken as a preferred example of the same and that various changes in the shape, size and arrangement of parts may be resorted to without departing from the spirit of the invention or the scope of the subjoined claims.

What is claimed is:

1. A gauge for sensing the amount of erosion of a solid material having a surface subject to erosive conditions comprising, in combination, a pair of closely spaced electrically conductive, erosion elements embedded in the material and having outer ends extending to and terminating at the plane of the surface; insulation between said elements and between the material and said elements; said ends including a ground weld continuously maintained during such erosion; circuit means including said elements, said weld and a source of electrical power for passing a substantially constant current through said elements and said weld; and means in said circuit for indicating voltage changes effected therein by length changes of said elements due to erosion of said ends.

2. A gauge for sensing the amount of erosion of a solid material having a surface subject to erosive conditions and having a bore therein, comprising, in combination, a hollow tubular body mounted in the bore and terminating flush with the surface; a pair of closely spaced, electrically conductive, erosion elements; means for mounting said elements in said body with their outer ends extending to and terminating at the plane of the surface; insulation means separating said elements from each other and from said means; said ends including a ground weld continuously maintained during such erosion; circuit means including said elements, said weld and a source of electrical power for passing a substantially constant current through said elements and said weld; and means in said circuit for indicating voltage changes effected therein by length changes of said elements due to erosion of said ends.

3. A gauge for sensing the amount of erosion of a solid material having a surface subject to erosive conditions and having a bore therein, comprising, in combination, a pair of closely spaced insulated, electrically conductive elements having a substantially constant specific resistance mounted in the bore and having exposed end portions terminating at the plane of the surface; said ends including a ground weld continuously maintained during such erosion; circuit means including said elements, said weld and a source of electric power for passing a substantially constant current through said elements and said weld; and means in said circuit for indicating voltage changes effected therein by length changes of said elements due to erosion of said ends.

References Cited by the Examiner

UNITED STATES PATENTS

| 2,829,185 | 4/1958 | Macatician | 136—4 |
| 2,915,305 | 12/1959 | Craig | 73—86 |
| 2,993,366 | 7/1961 | Birkness | 73—86 |
| 2,994,219 | 8/1961 | Schaschl | 73—86 |
| 3,015,950 | 1/1962 | Doctor et al. | 73—86 |

OTHER REFERENCES

Colvin et al.: Grinding Practice, N.Y., McGraw-Hill Book Co., 1950, page 403.

Burkart, W.: Mechanical Polishing, Teddington, England, Robert Draper Ltd. 1960, page 20.

RICHARD C. QUEISER, *Primary Examiner.*

W. L. CARLSON, *Examiner.*